United States Patent [19]

Robertson et al.

[11] Patent Number: 5,042,523
[45] Date of Patent: Aug. 27, 1991

[54] LIQUID PROPORTIONING SYSTEM

[75] Inventors: Jeffrey W. Robertson; Gilbert G. Kosup, both of St. Louis, Mo.

[73] Assignee: The Davies-Young Company, Maryland Heights, Mo.

[21] Appl. No.: 442,059

[22] Filed: Nov. 28, 1989

[51] Int. Cl.$^5$ .................................................. F16K 11/00
[52] U.S. Cl. .................................. 137/271; 137/599.1; 137/605
[58] Field of Search ............... 137/599, 605, 606, 607, 137/269, 271, 889, 893, 895, 599.1; 251/118; 138/45

[56] References Cited

U.S. PATENT DOCUMENTS

| | | | |
|---|---|---|---|
| 2,821,210 | 1/1958 | Liley | 137/599 |
| 3,010,404 | 11/1961 | Anderson | 103/152 |
| 3,168,333 | 2/1965 | Dziura | 285/35 |
| 3,459,375 | 8/1969 | Goffin | 138/45 X |
| 3,476,136 | 11/1969 | Weisgerber | 137/231 |
| 3,540,476 | 11/1970 | Fuerst | 137/606 |
| 3,712,335 | 1/1973 | Wiebe | 137/599 |
| 3,762,439 | 10/1973 | Heath | 137/893 X |
| 3,807,426 | 4/1974 | Henes | 137/100 |
| 4,250,919 | 2/1981 | Booth et al. | 137/607 |
| 4,599,171 | 7/1986 | Padilla et al. | 210/257 |
| 4,778,204 | 10/1988 | Berger | 285/353 |
| 4,781,217 | 11/1988 | Rosenberg | 251/118 |
| 4,787,655 | 11/1988 | Gross et al. | 285/151 |
| 4,803,053 | 2/1989 | Williamson | 422/101 |

OTHER PUBLICATIONS

Title: Automatic Feeding and Proportioning, Author: Dema Engineering Co., St. Louis, Mo., Year: Circa 1989, pp.: 2-3.
Title: Perfecting Corp., Author: Perfecting Corp., Charlotte, N.C., Year: 1986, pp.: 18-19.
Title: Hydromaster Series, Author: Hydro Systems Co., Cincinnati, Ohio, Year: 1988.
Title: Omniclean Streamline Series, Author: Hydro Systems Co., Cincinnati, Ohio, Year: 1988.
Title: Omniclean Series, Author: Hydro Systems Co., Cincinnati, Ohio, Year: 1988.
Title: Tolco Corporation Product Catalog, Author: Tolco Corp., Toledo, Ohio, Year: 1989, p.: 14.
Title: Chemtrol Proportioning System, Author: National Sanitary Supply Co., Los Angeles, Calif., Year: Unknown.

Primary Examiner—Stephen M. Hepperle
Attorney, Agent, or Firm—Senniger, Powers, Leavitt & Roedel

[57] ABSTRACT

A liquid proportioning system constructed according to the principles of the present invention mixes a primary liquid with liquid additive from at least one liquid additive reservoir. The system includes a manifold in which the primary liquid and the liquid additive are mixed. The manifold has an outlet for discharging the mixture, a first inlet for receiving the primary liquid and a second inlet for receiving liquid additive. A plurality of conduits each carry the liquid additive to the manifold from the liquid additive reservoir. Each conduit delivers the liquid additive to the manifold at a different rate under substantially the same operating conditions so that the connection of each conduit to the second inlet results in a different predetermined mixing proportion. Quick connect couplings connect each conduit to the second inlet of the manifold so that the conduits may be quickly connected to and disconnected from the second inlet to change the mixing proportion.

23 Claims, 1 Drawing Sheet

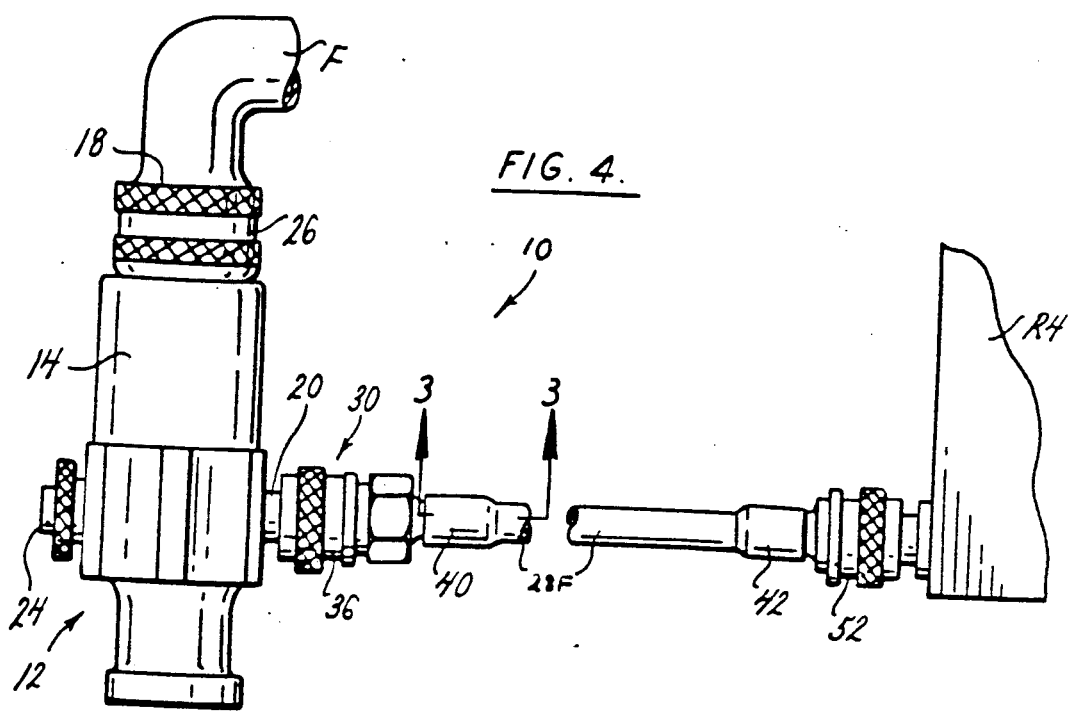
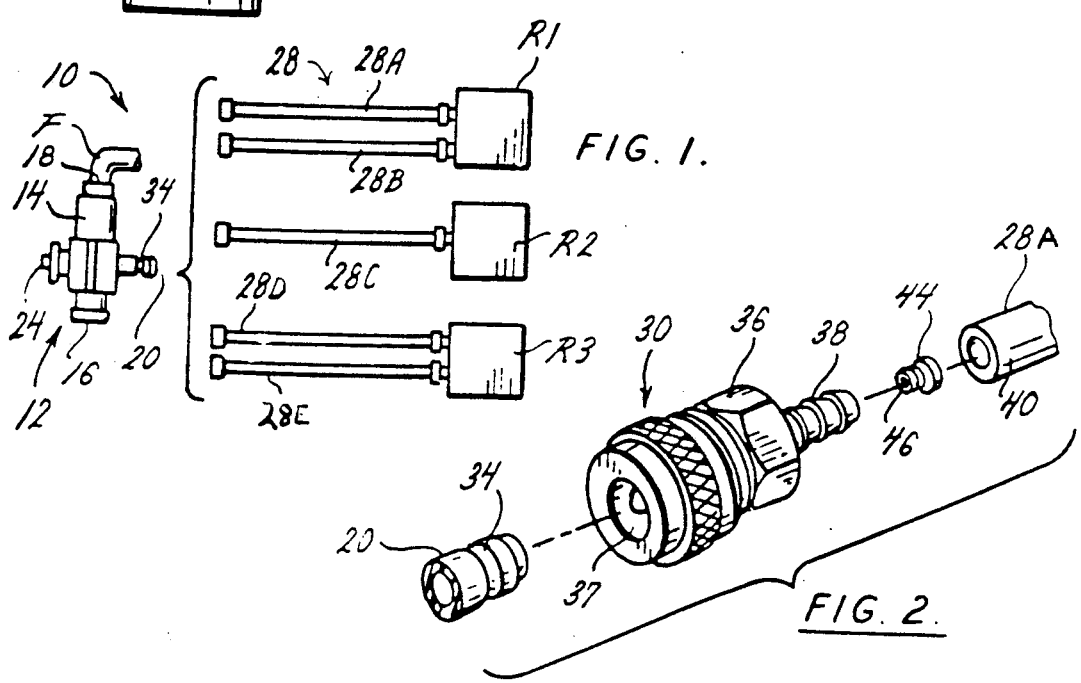
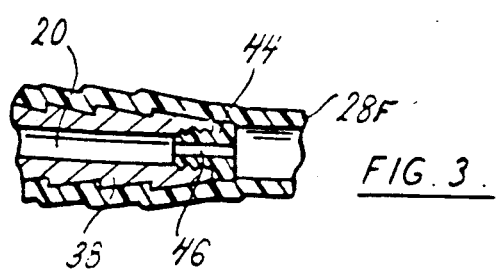

LIQUID PROPORTIONING SYSTEM

BACKGROUND OF THE INVENTION

This invention relates generally to proportioner devices for mixing liquids in predetermined relative proportions and more particularly to a liquid proportioning system adapted for quick change of the relative mixing proportion of the liquids.

Liquid proportioner devices of the type to which the present invention relates are particularly applicable in the dilution of a concentrated liquid chemical, such as a detergent, in water prior to use. Such devices are commonly used in building maintenance applications for mixing concentrated cleaning chemicals. Previously, to change the relative mixing proportion (dilution ratio) of the concentrate with water the user had to replace a relatively small metering tip in the liquid chemical flow line which controlled the flow rate of the liquid chemical into a mixing chamber. Disassembly of the proportioner device and manipulation of the metering tips is a slow, cumbersome process. In order to assure the proper dilution ratio, a chart has to be read which relates the particular liquid chemical being diluted to the specific metering tip to be employed. The flow line is often semi-permanently attached so that it is difficult to remove from the liquid proportioner device. The small size of the metering tips makes them extremely difficult to handle, and easy to lose in a janitor's closet crowded with equipment.

With the present liquid proportioning devices, a user may easily select the wrong device by misreading the chart or simply forgetting to change the metering tip which is unseen unless the device is disassembled. The user may also intentionally not follow the recommended dilution of the detergent out of the view that if a little is good, a lot is better. Selection of the proper dilution ratio cannot be overemphasized where detergents are involved. If the dilution ratio is too high in detergent, the item to be cleaned can be damaged.

The same problems described above associated with selecting and changing the metering tip arise when a different chemical is to be diluted with the same liquid proportioner device. A different chemical usually requires a different dilution for use. In addition, different chemicals have different flow characteristics requiring different metering tips to produce the same dilution ratio.

Presently, some liquid proportioning systems are available which provide variable dilution ratios of a concentrated liquid chemical and/or multiple concentrated liquid chemicals without manipulation of the metering tips. However, these systems consist of a plurality of individual liquid proportioning devices and metering tips, one for each chemical and/or dilution ratio. Such systems provide a fixed number of dilution ratios for a fixed number of liquid additives. Any change from the preset configuration will require changing the metering tips. Additionally, such systems are prohibitively expensive for most applications.

Therefore, there is presently a need for a liquid proportioning system having a simple and yet inexpensive mechanism for changing the liquid chemical or the dilution ratio of the liquid chemical.

SUMMARY OF THE INVENTION

Among the several objects of the present invention is the provision of a liquid proportioning system in which the mixing proportion of the liquids and/or liquids being mixed can be quickly changed with a minimum of manipulation; the provision of such a system which facilitates selection of the proper mixing proportion of the liquids; and the provision of such a system which is economical.

Additional objects of the present invention include the provision of a method for selecting a mixing proportion which simplifies selection of a proper mixing proportion; the provision of such a method which simplifies mixing of a different liquid.

A liquid proportioning system constructed according to the principles of the present invention mixes a primary liquid with liquid additive from at least one liquid additive reservoir. The system is adapted for quick change among any one of a plurality of predetermined mixing proportions and/or among any one of a plurality of liquid additives. In general, the system comprises a manifold in which the primary liquid and the liquid additive are mixed. The manifold includes an outlet for discharging the mixture, a first inlet for receiving the primary liquid and a second inlet for receiving liquid additive. A plurality of conduits are each adapted to carry the liquid additive to the manifold from the liquid additive reservoir. The conduits are further adapted to conduct liquid additives to the manifold at a different rates and/or from different reservoirs. Quick connect means is provided to selectively connect each of the conduits to the second inlet of the manifold so that the conduits may be quickly connected to and disconnected from the second inlet.

In another aspect of the present invention, a method for diluting one concentrated liquid at a time in a primary liquid using a liquid proportioning system. The system comprises a manifold for receiving and mixing the primary liquid and concentrated liquid supplied to the manifold through a conduit connected to the manifold, at least one reservoir for liquid additive and quick connect couplings for connecting the conduit to the manifold. The method comprises selecting a first one of a plurality of conduits adapted to conduct liquid additives at different rates and/or from different reservoirs, and quick-connecting said one conduit to the manifold.

Other objects and features will be in part apparent and in part pointed out hereinafter.

BRIEF DESCRIPTION OF THE DRAWINGS

FIG. 1 is a schematic of a liquid proportioning system of the present invention:

FIG. 2 is an exploded perspective of the quick connect coupling components of the liquid proportioning system;

FIG. 3 is a fragmentary section taken in the plane including line 3—3 of FIG. 4; and FIG. 4 is an enlarged elevation of the liquid proportioning system connected to a reservoir.

Corresponding reference characters indicate corresponding parts throughout the several views of the drawings.

DETAILED DESCRIPTION OF THE PREFERRED EMBODIMENTS

Referring now to the drawings and particularly to FIG. 1, a liquid proportioning system, generally indicated at 10, for mixing a primary liquid with liquid additive from at least one reservoir is shown. Three liquid additive reservoirs, indicated at R1, R2 and R3 respectively, are shown in FIG. 1. The system 10 of the present invention is adapted for quick change among any one of a plurality Of predetermined mixing proportions and/or among liquid additives to be mixed. The system 10 includes a manifold, generally indicated at 12, having a mixing chamber (not shown) in which the primary liquid and the liquid additive are mixed. The manifold 12 has a body 14 including an outlet 16 for discharging the mixture, a first inlet 18 for receiving the primary liquid and a second inlet 20 for receiving liquid additive. A button 24 on the manifold body 14 generally opposite the second inlet 20 is operable to open a valve (not shown) in the manifold 12 to allow the liquid additive to be aspirated into the mixing chamber by the primary liquid flowing through the manifold. In the preferred embodiment, the manifold is a liquid proportioning device (model number 167, appearing in Catalog No. 84 at page 2) manufactured by DEMA Engineering Company of St. Louis, Mo., modified as described below to be fitted with quick connect means.

The system 10 is particularly, although not exclusively, suited for dilution of concentrated cleaning solutions such as commonly used in building maintenance. The first manifold inlet 18 is adapted for releasable connection to a source of primary liquid (e.g. water). In the preferred embodiment, the releasable connector of the first manifold inlet 18 is an internally threaded sleeve 26 which may be screwed onto the externally threaded outlet of a sink faucet F, such as found in a janitor's closet. Alternatively the manifold 12 may be connected to a siphon breaker (not shown) which is connected to the faucet F.

The liquid proportioning system 10 includes a plurality of conduits which are generally indicated at 28 in the drawings and individually designated 28A–28F. The conduits are each adapted to carry the liquid additive to the manifold 12 from the liquid additive reservoirs R1-R3. Although three reservoirs R1-R3 are shown in FIG. 1, each storing a different liquid additive, the system 10 of the present invention may be used with one liquid additive reservoir or with more than three. The conduits 28 are adapted to conduct liquid additives to the manifold 12 at different rates and/or from different reservoirs. Therefore, connection of each conduit 28 to the second inlet 20 of the manifold 12 results in a different predetermined mixing proportion of liquid additive and primary liquid or a in different liquid additive being mixed. Quick connect means, indicated generally at 30, connects each of the conduits 28 to the second inlet 20 of the manifold 12 so that the conduits may be quickly connected to and disconnected from the second inlet to quickly and accurately change the mixing proportion or the liquid additive being mixed.

The quick connect means comprises a first quick connect coupling component 34 associated with the second manifold inlet 20 and a second quick connect coupling component 36 associated with each conduit 28. As shown in FIG. 1, the second inlet 20 is a tubular extension projecting laterally outwardly from the manifold body 14. The first quick connect coupling component 34 is a male component integrally formed with the second inlet 20. As shown in FIG. 2, the second quick connect coupling component 36 comprises a female component having an opening 37 at one end adapted to receive the first quick connect coupling component 34 for coupling the second inlet 20 with the conduit 28A. A ribbed stem 38 located opposite the opening 37 securely connects the female component to the conduit 28A. The disposition of the male and female components on the conduit 28A and on the second inlet 20 of the manifold may be reversed and remain within the scope of the invention. The second quick connect coupling component 36 is of the type which will automatically close itself to flow of liquid additive from the conduit 28 when the component is not connected with the first quick connect coupling component 34. Therefore leakage of liquid additive can be prevented when changing conduits 28 coupled to the second manifold inlet 20. Examples of a quick connect hose coupling particularly suited for the present invention are the 1A Series male end and female end connectors available from Perfecting Corporation of Charlotte, N.C. Such connectors appear in the Perfecting Corporation catalog of Oct. 7, 1986, at page 18, which is incorporated herein by reference.

Each conduit 28 comprises a length of flexible tubing having a first end 40 and a second end 42. In the preferred embodiment, the first end 40 of the tubing is connected to the second quick connect coupling component 36 and the second end 42 is connected to one of the liquid additive reservoirs R1-R3. Flow regulating means, constituting in this embodiment a metering tip 44, in each of the conduits 28 regulates the flow rate of liquid additive from the its reservoir to the manifold 12. As shown in FIG. 3, the metering tip 44 has a passage 46 therethrough of reduced cross sectional diameter to control the rate of flow of liquid additive through the metering tip. The metering tip 44, in the preferred embodiment, is threaded so that it may be screwed into the end of the ribbed stem 38 of the second quick connect coupling component 36 before the first end 40 of the flexible tubing is fit over the stem.

Thus, the invention provides a liquid proportioning system 10 in which the mixing proportion of the liquids can be quickly changed with a minimum of manipulation, and which facilitates selection of the proper mixing proportion of the liquids.

Referring now again to FIG. 1 of the drawings, the method of the present system for changing the concentration of the liquid additive (e.g. a concentrated liquid detergent) in the primary liquid using a liquid proportioning system as described above may be illustrated as follows. A first one of the conduits 28A attached to the reservoir R1, is selected. The conduit is adapted, because it is fit with a metering tip 44 having a passage 46 of a specific cross section, to deliver the concentrated liquid detergent in reservoir R1 to the manifold 12 at a first predetermined rate. Therefore, when the selected conduit 2BA is quick-connected to the second inlet 20 of the manifold 12 the mixture discharged by the manifold will have a first predetermined concentration of the concentrated liquid detergent in the primary liquid. In operation, the dilution is carried out by turning on the faucet F so that primary liquid (e.g. water) is received through the first inlet 18 of the manifold 12. The button 24 is then depressed causing a valve in the manifold 12 is opened and the concentrated liquid detergent to be aspirated into the primary liquid.

Should a different mixing proportion of the concentrated liquid detergent in reservoir R1 be desired, the first conduit may be quick-disconnected from the second inlet 20 and a second one of the conduits 28B selected. The second conduit 28B has a metering tip 44 having a passage 46 of different cross section so that the second conduit 28B conducts the concentrated liquid detergent at a second rate different from that of the first conduit. Therefore, a different mixing proportion results when the second conduit is subsequently quick-connected to the second inlet 20 of the manifold 12. To change the liquid additive being diluted, the second conduit 28B may be quick-disconnected from the manifold 12. Then, a third conduit 28C, connected to a different reservoir R2 containing a different concentrated liquid detergent, is selected and quick-connected to the second inlet 20. The conduit 28C is preset to conduct the liquid additive at a rate to provide the proper mixing proportion of detergent to primary liquid. Even if the same concentration is required, the metering tip must be different in order to compensate for the specific flow characteristics of the different detergent.

Thus, the present invention allows the mixing proportions to be changed quickly without manipulating the relatively small metering tips 44. The dilution ratios associated with each conduit may be clearly indicated on the conduit so that the proper dilution of the concentrated liquid may be made without reference to charts and without changing a metering tip. Further, the preset mixing proportions of each conduit 28 assure consistent, correct mixing proportions for each liquid additive.

Although no more than two conduits 28 are shown to be attached to a single reservoir R1, R3, in FIG. 1, more could be attached as different mixing proportions are required. However, in most instances such as for dilution of concentrated cleaning chemicals, no more than two mixing proportions are necessary.

As shown in FIG. 4 of the drawings, the liquid proportioning system of the present invention may also be adapted for quick connect coupling with any of the liquid additive reservoirs. A third quick connect coupling component 52 adapted for quick connection to and disconnection from a liquid additive reservoir R4 is attached to the second end of each conduit 28. The third component is identical to the second quick connect coupling component 36, and a component (not shown) corresponding to the first quick connect coupling component 34 is associated with the reservoir R4. However, the disposition of the components could be reversed. With a quick connect coupling for connecting the conduit to one of the reservoirs, there is only a need to provide one outlet in each reservoir. The mixing proportion and/or liquid additive may be changed by entirely replacing the conduit 28 connecting the reservoir to the manifold 12.

The method of diluting a liquid additive in a primary liquid in a liquid proportioning system having the third quick connect coupling component 52 is as follows. A first conduit (such as conduit 28F as shown in FIG. 4) is quick-disconnected from the manifold 12 and from the reservoir R4. A second one of the conduits (not shown), which conducts the liquid additive to the manifold at different rate than the first conduit 28F, is quick connected to the manifold 12 and to the reservoir R1. The order of connection to the reservoir and to the manifold is not critical to the invention. The mixture discharged from the manifold thus has a different concentration of liquid additive than the mixture discharged by the connection of the first conduit 28F to the manifold. Similarly, the liquid additive being mixed with the primary liquid may be changed by quick-disconnecting the second conduit from the manifold 12 and the reservoir. Then, one of the conduits is selected to connect to the manifold 12 and a different one of the liquid additive reservoirs. Of course, the conduit selected could be the stated second conduit should it have the appropriate metering tip 44 for producing the desired concentration of the liquid additive.

There are, typically, only a few dilution ratios proper for each kind of concentrated liquid detergent. Therefore, with the present invention, concentrated liquid detergent may be packaged with conduits adapted to produce these ratios when attached to a standardized mixing manifold. The only step then required to use the detergent is to connect the proper conduit to the manifold. The conduits may be marked simply "floors" and "windows" to indicate the job the detergent will perform rather than or in addition to the dilution ratio associated with each conduit. The present invention thus takes out determination of which metering tip will produce a needed dilution ratio of the liquid additive. Manipulation of the small metering tips is also eliminated. Further, the quick connect couplings provided add to the time saved in changing the liquid to be diluted or the dilution ratio.

Similarly, the method of the present invention reflects that the dilution ratio needed for a particular job is selected by choosing a specific conduit which is preconfigured to produce the correct dilution ratio when connected to the manifold. The selection of a pre-configured conduit is much simpler and quicker than disassembling the system to change a metering tip.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a liquid proportioning system of the type adapted for mixing a primary liquid with one liquid additive at a time, the system comprising a manifold for receiving and mixing the primary liquid and liquid additive supplied to the manifold, the manifold having an outlet for discharging the mixture, a first inlet for receiving the primary liquid and a second inlet for receiving the liquid additive, and at least one reservoir for liquid additive, the improvement comprising a plurality of conduits for conducting liquid additives, a plurality of metering means, one metering means being associated with each of the conduits for controlling the flow rate of liquid additive through the conduit, at least two of said metering means being adapted to conduct liquid additive at different predetermined rates, and quick connect means associated with each of the conduits for releasably securing each of the conduits in engagement with the manifold at said second inlet, and allowing the conduits to be quickly engaged and disengaged with the manifold at the second inlet so that the liquid additive and/or its rate of delivery can be changed.

2. The liquid proportioning system as set forth in claim 1 wherein said quick connect means comprises a first quick connect coupling component associated with the manifold and a second quick connect coupling component associated with each conduit.

3. The liquid proportioning system as set forth in claim 2 wherein said first quick connect coupling component is a male component and wherein said second quick connect coupling component is a female component.

4. The liquid proportioning system as set forth in claim 2 wherein said first quick connect coupling component is a female component and wherein said second quick connect coupling component is a male component.

5. The liquid proportioning system as set forth in claim 2 wherein said second quick connect coupling component is adapted to close the conduit to flow of liquid additive out of each conduit when it is not connected to said first quick connect coupling component.

6. The liquid proportioning system as set forth in claim 2 wherein said first quick connect coupling component is integrally formed with said manifold.

7. The liquid proportioning system as set forth in claim 1 wherein the manifold is adapted for releasable connection to a source of primary liquid.

8. The liquid proportioning system as set forth in claim 1 wherein each conduit comprises a length of flexible tubing having first and second ends.

9. The liquid proportioning system as set forth in claim 8 wherein said second quick connect coupling component is located at the first end of the flexible tubing, and wherein the system further comprises a third quick connect coupling component located at the second end of the flexible tubing and adapted for quick connection to and disconnection from the liquid additive reservoirs.

10. A liquid proportioning system for mixing a primary liquid with liquid additive from at least one liquid additive reservoir, the system being adapted for quick change among any one of a plurality of predetermined mixing proportions, the system comprising, a manifold in which the primary liquid and the liquid additive are mixed, the manifold including an outlet for discharging the mixture, a first inlet for receiving the primary liquid and a second inlet for receiving liquid additive, a plurality of conduits adapted to carry the liquid additive to the second inlet of the manifold from the liquid additive reservoir, each conduit being adapted to deliver the liquid additive to the second inlet of the manifold at a different, predetermined rate under substantially the same operating conditions so that the connection of each conduit to the second inlet results in a different predetermined mixing proportion, and quick connect means for releasably securing each conduit in engagement with the manifold at the second inlet whereby the conduits may be quickly engaged and disengaged with the manifold at the second inlet to change the mixing proportion.

11. The liquid proportioning system as set forth in claim 10 wherein said quick connect means comprises a first quick connect coupling component associated with said second manifold inlet and a second quick connect coupling component associated with each conduit.

12. The liquid proportioning system as set forth in claim 11 wherein said first quick connect coupling component is a male component and wherein said second quick connect coupling component is a female component.

13. The liquid proportioning system as set forth in claim 11 wherein said first quick connect coupling component is a female component and wherein said second quick connect coupling component is a male component.

14. The liquid proportioning system as set forth in claim 11 wherein said second quick connect coupling component is adapted to close the conduit to flow of liquid additive out of each conduit when it is not connected to said first quick connect coupling component.

15. The liquid proportioning system as set forth in claim 11 wherein said first quick connect coupling component is integrally formed with said second manifold inlet.

16. The liquid proportioning system as set forth in claim 10 wherein said first manifold inlet is adapted for releasable connection to a source of primary liquid.

17. The liquid proportioning system as set forth in claim 10 wherein each conduit includes metering means for regulating the flow rate of liquid additive from the reservoir.

18. The liquid proportioning system as set forth in claim 10 wherein each conduit comprises a length of flexible tuning having first and second ends.

19. The liquid proportioning system as set forth in claim 18 wherein said second quick connect coupling component is located at the first end of the flexible tubing, and wherein the system further comprises a third quick connect coupling component located at the second end of the flexible tubing and adapted for quick connection to and disconnection from the liquid additive reservoir.

20. A method for quickly changing the concentration of a liquid additive in a primary liquid being mixed in a manifold having an outlet for discharging the mixture, a first inlet for receiving the primary liquid and a second inlet for receiving the liquid additive, the method comprising, providing a plurality of conduits adapted to conduct liquid additives at different predetermined rates, providing quick connect means for each conduit for releasably securing the conduits in engagement with to the manifold at the second inlet, quickly disengaging a first one of the conduits from the manifold at the second inlet, said first conduit being adapted to conduct liquid additive to the manifold at a first rate, selecting a second one of the conduits, said second conduit being adapted to conduct liquid additive to the manifold at a different rate than said first conduit, and quickly engaging said second conduit with the manifold at the second inlet thereby changing the mixing proportion of liquid additive to primary liquid from that produced by the connection of said first conduit to the manifold.

21. A method for quickly changing the liquid additive being mixed with a primary liquid in a manifold having an outlet for discharging the mixture, a first inlet for receiving the primary liquid and a second inlet for receiving the liquid additive, the method comprising, providing a plurality of liquid additive reservoirs, providing a plurality of conduits attached to different liquid additive reservoirs, providing a plurality of metering means, one metering means being associated with each of the conduits for controlling the flow rate of liquid additive through the conduit, at least two of said metering means being adapted to conduct liquid additive at different predetermined rates, providing quick connect means for each conduit for releasably securing the conduits in engagement with the manifold at the second inlet, quickly disengaging a first one of the conduits from the manifold at said second inlet, said first conduit being attached to a first one of the liquid additive reservoirs containing a first liquid additive, selecting a second one of the conduits, said second conduit being attached to a second one of the liquid additive reservoirs containing a second liquid additive, and quickly engaging said second conduit with the manifold at the second inlet.

22. A method for quickly changing the concentration of a liquid additive from at least one liquid additive reservoir in a primary liquid mixed in a manifold having an outlet for discharging the mixture, a first inlet for receiving the primary liquid and a second inlet for receiving the liquid additive, the method comprising, providing a plurality of conduits adapted to conduct liquid additives at different predetermined rates, providing first quick connect means for each conduit for releasably securing each of the conduits in engagement with the manifold at the second inlet and second quick connect means for securing the conduits in engagement with the liquid additive reservoir, quickly disengaging a first one of the conduits from the manifold at the second inlet and from the liquid additive reservoir, said first conduit being adapted to conduct liquid additive to the second inlet of the manifold at a first rate, selecting a second one of the conduits, said second conduit being adapted to conduct liquid additive at a different rate than said first conduit, and quickly engaging said second conduit with the manifold at the second inlet and with the liquid additive reservoir thereby changing the mixing proportion of liquid additive to primary liquid from that produced by the engagement with said first conduit with the manifold.

23. A method for quickly changing the liquid additive being mixed with a primary liquid in a manifold having an outlet for discharging the mixture, a first inlet for receiving the primary liquid and a second inlet for receiving the liquid additive, the method comprising, providing a plurality of liquid additive reservoirs, providing a plurality of conduits attached to different liquid additive reservoirs, providing a plurality of metering means, one metering means being associated with each of the conduits for controlling the flow rate of liquid additive through the conduit, at least two of said metering means being adapted to conduct liquid additive at different predetermined rates, providing first quick connect means for each conduit for releasably securing each of the conduits in engagement with the manifold at the second inlet and second quick connect means for securing the conduits in engagement with the liquid additive reservoirs, quickly disengaging one of the conduits from the manifold and from a first one of the liquid additive reservoirs containing a first liquid additive, selecting one of the conduits, and quickly engaging the selected conduit with the manifold and with a second one of the liquid additive reservoirs containing a second liquid additive.

* * * * *